(12) United States Patent
Ikebukuro

(10) Patent No.: US 10,986,825 B2
(45) Date of Patent: Apr. 27, 2021

(54) CASTING EVALUATION DEVICE AND CASTING EVALUATION PROGRAM

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 83 days.

(21) Appl. No.: 16/598,729

(22) Filed: Oct. 10, 2019

(65) Prior Publication Data

US 2020/0137995 A1  May 7, 2020

(30) Foreign Application Priority Data

Nov. 1, 2018 (JP) .............................. JP2018-206778

(51) Int. Cl.
*A01K 89/01* (2006.01)
*A01K 89/015* (2006.01)

(52) U.S. Cl.
CPC .............................. *A01K 89/01931* (2015.05)

(58) Field of Classification Search
CPC ............ A01K 89/0122; A01K 89/0178; A01K 87/007; G01H 1/14
See application file for complete search history.

(56) References Cited

U.S. PATENT DOCUMENTS

| 5,214,960 A | * | 6/1993 | Tsuboi | G01H 1/14 |
| | | | | 702/39 |
| 6,594,942 B1 | * | 7/2003 | Sherwood | A01K 87/007 |
| | | | | 43/17.5 |
| 2014/0358483 A1 | * | 12/2014 | da Rosa | G01D 9/28 |
| | | | | 702/188 |
| 2018/0295826 A1 | * | 10/2018 | Blackadar | A63F 13/46 |

FOREIGN PATENT DOCUMENTS

JP  2001-321042 A  11/2001

\* cited by examiner

*Primary Examiner* — Emmanuel M Marcelo
(74) *Attorney, Agent, or Firm* — Global IP Counselors, LLP

(57) ABSTRACT

A casting evaluation device includes a frequency derivator and a casting evaluator. Thee frequency derivator derives a frequency of sound or vibration based on an output of a sensor that detects the vibration or the sound that accompanies the release of a fishing line from a spool of a fishing reel. The casting evaluator evaluates prescribed evaluation items related to casting based on the frequency derived by the frequency derivator.

5 Claims, 5 Drawing Sheets

CASTING EVALUATION DEVICE AND CASTING EVALUATION PROGRAM

CROSS-REFERENCE TO RELATED APPLICATIONS

This application claims priority to Japanese Patent Application No. 2018-206778, filed on Nov. 1, 2018. The entire disclosure of Japanese Patent Application No. 2018-206778 is hereby incorporated herein by reference.

BACKGROUND

Field of the Invention

The present invention relates to a casting evaluation device and a casting evaluation program.

Background Art

The following technique is known as a line detection device that detects the amount of fishing line that has been released or cast from a spool of a spinning reel or the amount of fishing line that has been wound around the spool. That is, an infrared sensor is disposed on a fishing rod and a reflector is disposed on the spool of the spinning reel such that the infrared light emitted from the infrared sensor is reflected by the reflector and returned to the infrared sensor. The line detection device detects the number of times that the fishing line blocks the infrared light based on the output of the infrared sensor and detects the amount of fishing line that has been released from the spool or the amount of fishing line that has been wound around the spool based on the detected number of times (for example, refer to Japanese Published Unexamined Application No. 2001-321042).

For example, it is conceivable to evaluate casting by using the result of detection of the period during which the fishing line is released from the spool. In this situation, with the technique of Japanese Published Unexamined Application No. 2001-321042, if the period during which the fishing line blocks the infrared light is long, such as when the fishing line is being wound, it is possible to accurately calculate the discharge amount or the winding amount of the fishing line. On the other hand, if the period during which the fishing line blocks the infrared light is short, such as during casting, the calculation accuracy of the discharge amount or the winding amount of the fishing line is significantly reduced. For this reason, even if the technique of Japanese Published Unexamined Application No. 2001-321042 is applied to the evaluation of casting, it is difficult to achieve an accurate evaluation result that can be used in practice. In order to maintain high calculation accuracy based on the technique of Japanese Published Unexamined Application No. 2001-321042, for example, a highly sensitive infrared sensor and high-performance computing functions are required.

SUMMARY

The object of the present invention is to make it possible to achieve an accurate evaluation result that can be used in practice with a simple configuration when casting is evaluated by using the result of the detection of the period during which the fishing line is released from the spool.

One aspect of the present invention with respect to the solution of the problem described above is a casting evaluation device comprising a frequency derivation unit that derives sound or vibration frequency based on the output of a sensor that detects the vibration or sound that accompanies the release of a fishing line from the spool of a fishing reel, and a casting evaluation unit that evaluates prescribed evaluation items related to casting based on the frequency derived by the frequency derivation unit.

According to the configuration described above, it is possible to carry out an evaluation regarding casting with sufficient accuracy for practical use, with a simple configuration in which the fishing reel includes the sensor that detects vibration or sound that accompanies the release of fishing line from a spool.

Another aspect of the present invention is the casting evaluation unit described above, further including a notification unit that reports the evaluation results of the casting evaluation unit.

According to the configuration above, the user is able to ascertain the casting evaluation results.

Yet another aspect of the present invention is the casting evaluation device described above, wherein the casting evaluation unit calculates the discharge speed of the fishing line at a timing at which discharge of the fishing line is started based on a spool diameter and the frequency derived by the frequency derivation unit in accordance with the timing at which the discharge of the fishing line from the spool is started and outputs the calculated discharge speed as the evaluation result.

According to the configuration above, it is possible to evaluate the initial speed of the tackle when released by casting.

Yet another aspect of the present invention is the casting evaluation device described above, wherein the casting evaluation unit calculates the length of the fishing line that has been released during a discharge period based on the spool diameter and the frequency derived by the frequency derivation unit during the discharge period from the start of discharge of the fishing line from the spool until the end of discharge of the fishing line, and outputs the calculated fishing line length as the evaluation result.

According to the configuration above, it is possible to evaluate the casting flight distance of the tackle.

Yet another aspect of the present invention is a casting evaluation program that causes a computer as a casting evaluation device to function as a frequency derivation unit that derives the frequency of sound or vibration based on the output of a sensor that detects the vibration or sound that accompanies the release of a fishing line from the spool of a fishing reel, and a casting evaluation unit that evaluates prescribed evaluation items related to casting based on the frequency derived by the frequency derivation unit.

As described above, according to the present invention, it is possible to achieve an accurate evaluation result that can be used in practice with a simple configuration when casting is evaluated using the result of the detection of the period during which the fishing line is released from the spool.

DETAILED DESCRIPTION OF EMBODIMENTS

First Embodiment

Figure 1:
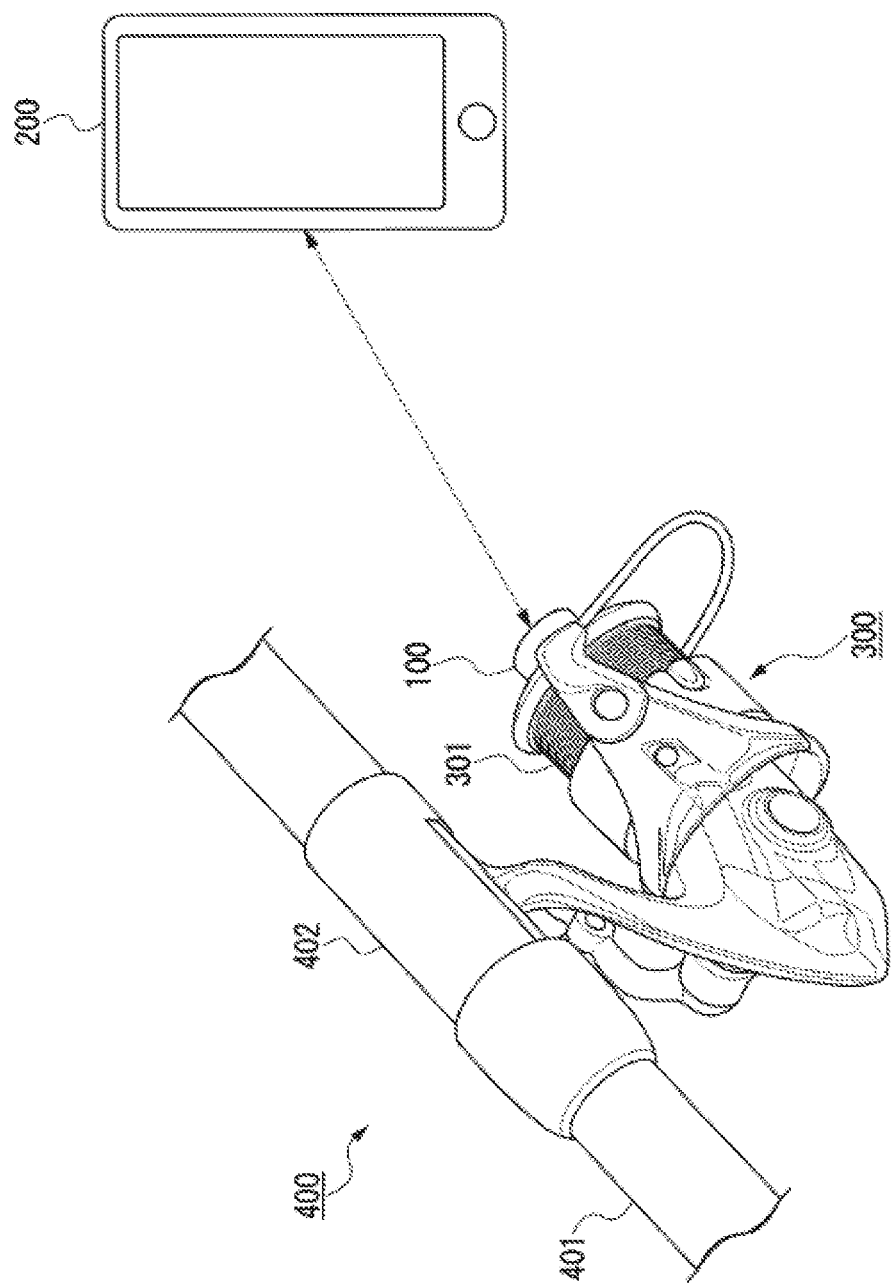
FIG. 1 is a view illustrating an example of the overall configuration of a casting evaluation system according to a first embodiment.

FIG. 1 illustrates an example of the overall configuration of a casting evaluation system according to a first embodiment. In the Figure, an embodiment in which a spinning reel is used as the fishing reel is described.

The Figure illustrates a state in which a spinning reel 300 is attached to a reel attachment pedestal (reel seat) 402 disposed on a rod body 401 of a fishing rod 400.

A sensor unit (sensor) 100 is disposed at a prescribed position from which it is possible to detect vibration that accompanies the release of a fishing line from a spool 301. FIG. 1 illustrates an example in which the sensor unit 100 is attached to a position of a drag knob in the spool 301.

The vibration that accompanies the release of fishing line from the spool 301 as a result of casting is generated periodically and corresponds to each round of the fishing line drawn from the spool 301. For this reason, the vibration that is detected by the sensor unit 100 has a cycle (frequency) corresponding to the speed with which the fishing line is drawn from the spool 301.

The sensor unit 100 can be configured to be retrofitted onto a prescribed position on the spinning reel 300. Alternatively, the spinning reel 300 can be a product in which the sensor unit 100 is pre-installed as a discrete component of the spinning reel 300.

The sensor unit 100 transmits a detection signal indicating the vibration detection result to a user terminal device 200 (one example of the casting evaluation device or casting evaluator). An example in which communication between the sensor unit 100 and the user terminal device 200 is carried out wirelessly is shown in the drawing. The method of wireless communication between the sensor unit 100 and the user terminal device 200 is not particularly limited, one example of wireless communication technology is sold under the trademark BLUETOOTH.

Communication between the sensor unit 100 and the user terminal device 200 can be carried out via a cable.

The user terminal device 200 is a terminal device that is owned by a user. An example in which the user terminal device 200 is a mobile terminal device such as a smartphone is shown in the drawing. An application software (casting evaluation application) corresponding to the casting evaluation system of the present embodiment is installed in the user terminal device 200 as a smartphone, or the like, The user terminal 200 can be, for example, a dedicated terminal specializing in the casting evaluation of the present embodiment.

Figure 2:
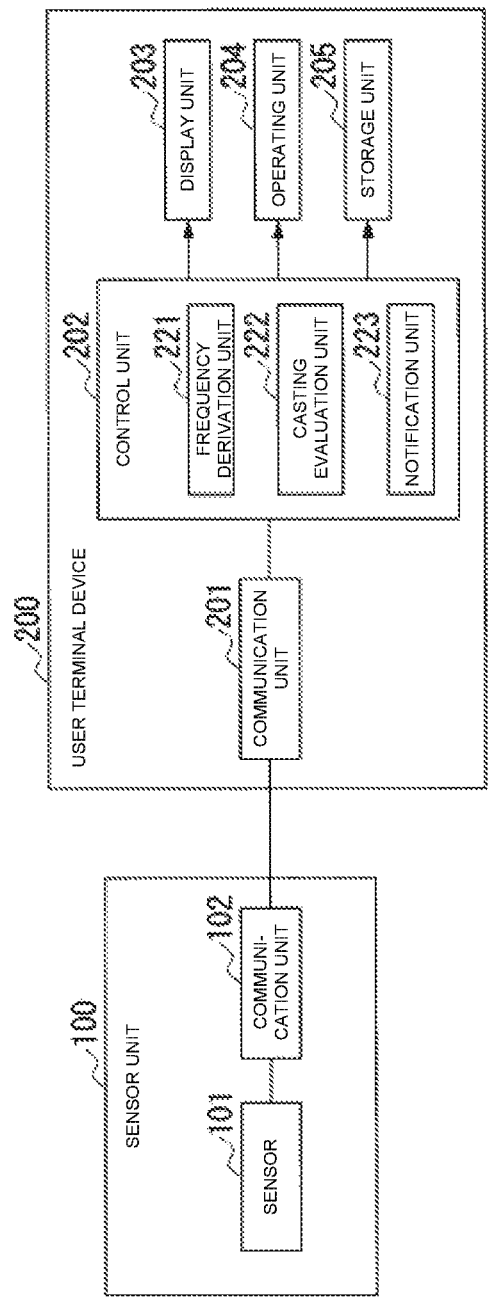
FIG. 2 is a view illustrating a configuration example of a sensor unit and a user terminal device according to the first embodiment.

FIG. 2 illustrates an embodiment of the sensor unit 100 and the user terminal device 200.

The sensor unit 100 in the drawing comprises a sensor 101 and a communication unit (communicator) 102.

The sensor 101 detects vibration. The sensor 101 can be configured to be capable of detecting vibration by including, for example, an acceleration sensor or a piezoelectric element.

The communication unit 102 executes wireless communication with the user terminal device 200.

The user terminal device 200 comprises a communication unit (communicator) 201, a control unit (controller) 202, a display unit (display) 203, an operating unit (operator) 204, and a storage unit (storage) 205.

The communication unit 201 executes wireless communication with the communication unit 102 of the sensor unit 100.

The control unit 202 executes control related to the casting evaluation according to the present embodiment. The functions of the control unit 202 are realized by a program installed in a CPU (Central Processing Unit) disposed in the user terminal device 200, and can be, for example, installed reel braking adjustment application software.

The control unit 202 in the drawing includes a frequency derivation unit (frequency derivator) 221, a casting evaluation unit (casting evaluator) 222, and a notification unit (notifier) 223.

The frequency derivation unit 221 calculates the frequency of vibration based on the output of the sensor 101 that detects vibration that accompanies the release of fishing line from the spool 301. That is, the sensor 101 of the sensor unit 100 outputs a detection signal corresponding to the detection of vibration to the communication unit 102. The communication unit 102 transmits the input detection signal to the user terminal device 200. The communication unit 201 of the user terminal device 200 receives the transmitted detection signal. The frequency derivation unit 221 acquires the received detection signal. The frequency derivation unit 221 derives the vibration frequency of the acquired detection signal.

The casting evaluation unit 222 evaluates prescribed evaluation items related to casting based on the frequency derived by the frequency derivation unit 221. Specifically, the evaluation items related to casting in the present embodiment are the initial casting speed and flight distance.

The initial casting speed is the discharge speed of the fishing line when the discharge of the fishing line from the spool is started (that is, the initial speed of the flight speed of the tackle connected to the fishing line) as a result of a cast by the user.

The flight distance is the length of the fishing line that is released at the end of a user cast. In the present embodiment, the length of the released fishing line is treated as the flight distance of the tackle that is connected to the fishing line.

The casting evaluation unit 222 calculates the initial casting speed and the flight distance, and outputs information related to the calculated initial casting speed and flight distance as a result of the casting evaluation.

The casting evaluation unit 222 can calculate the initial casting speed as follows.

That is, the frequency derivation unit 221 inputs the frequency (frequency at start of discharge) derived based on the detection signal corresponding to the timing at which discharge of the fishing line is started in accordance with the casting being carried out to the casting evaluation unit 222. The casting evaluation unit 222 calculates the initial casting speed Vst (km/h) by the following Equation 1, using Fs (Hz) as the frequency at start of discharge and S1 (mm) as a representative value (representative spool diameter value) of the diameter (spool diameter) in a state in which the line is wound around the spool 301.

$$Vst = Fs \times S1\pi \times 3600/1000000 \qquad \text{(Equation 1)}$$

The spool diameter representative value S1 in this embodiment can be, for example, the value of the radius of the bobbin portion of the spool 301, for example, in a state in which a prescribed length of the fishing line is wound around the spool 301.

As a specific example, the user often winds the fishing line around the spool 301 in accordance with a standard line winding amount set by the manufacturer. In this embodiment, at the start of the fishing line discharge period, the amount of the fishing line essentially corresponding to the standard line winding amount is wound around the spool 301. Therefore, the radius of the bobbin portion of the spool 301 (spool diameter) in a state in which the amount of fishing line corresponding to the standard line winding amount is wound therearound can be applied as the spool 301 diameter representative value S1 that is used for calculating the initial casting speed.

The casting evaluation unit 222 can acquire the spool diameter representative value S1 from the storage unit 205 during calculation of the initial casting speed Vst using Equation 1.

In this embodiment, the user sets the spool diameter representative value S1 for the casting evaluation application prior to causing the user terminal device 200 to carry out the casting evaluation. For example, the user can set the spool diameter representative value S1 by carrying out an operation to input a numerical value corresponding to the spool diameter representative value S1. The spool diameter representative value S1 set in this manner is stored in the storage unit 205.

When the user inputs the spool diameter representative value S1, for example, the spool diameter corresponding to the standard line winding amount can be used, as described above. The spool diameter corresponding to the standard line winding amount can be, for example, a value published by the manufacturer of the spinning reel 300 or a value that the user measures himself or herself.

Alternatively, the user can carry out an operation to select the spinning reel that the user uses from among a list of spinning reel models, and the spool diameter representative value S1 corresponding to the selected spinning reel can be set.

In addition, for example, in the embodiment in which the spinning reel 300 is a product in which the sensor unit 100 is disposed as a discrete component, the spool diameter representative value S1 can be stored in the sensor unit 100. Additionally, the spool diameter representative value S1 can be set in the user terminal device 200 by the transmission of the spool diameter representative value S1 from the sensor unit 100 to the user terminal device 200 when communication with the user terminal device 200 is enabled.

In addition, the casting evaluation unit 222 can calculate the flight distance as follows. The casting evaluation unit 222 first calculates a total vibration frequency N during a period in which the fishing line is released in accordance with the casting.

For this purpose, the casting evaluation unit 222 acquires a time length Tr (sec) of the fishing line discharge period, the frequency at the start of discharge of the fishing line (frequency at the start of discharge) Fs, and the frequency at a timing immediately before the end of discharge of the fishing line (frequency at the end of discharge) Fe.

Figure 3A:
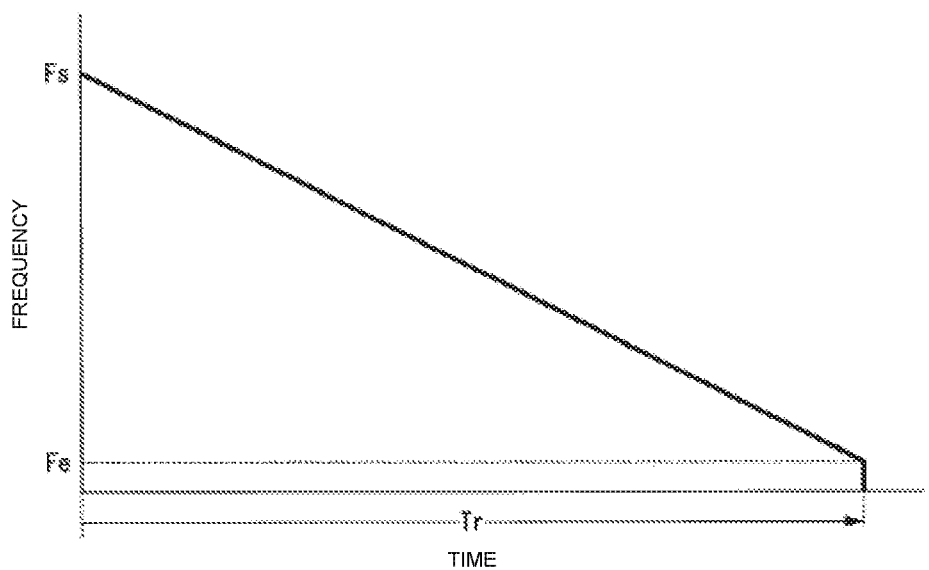
FIG. 3 is a view explaining an example of a method for calculating total vibration frequency according to the first embodiment.

FIG. 3A illustrates the relationship between the time length Tr, the frequency Fs, and the frequency Fe corresponding to the fishing line discharge period.

The casting evaluation unit 222 can acquire the time length Tr of the fishing line discharge period by measuring the time from when a waveform pattern of the detection signal begins to display a significant state that corresponds to vibration until the time that the state ends, in accordance with the fishing line discharge period.

Additionally, the casting evaluation unit 222 can acquire the frequency at the start of discharge Fs and the frequency at the end of discharge Fe by acquiring, from among the frequencies derived by the frequency derivation unit 221 in accordance with the fishing line discharge period, the first derived frequency and the last derived frequency.

In the fishing line discharge period, the frequency changes so as to gradually decrease from a maximum value at the start of discharge of the fishing line and reaches a minimum at the timing immediately before the discharge of the fishing line ends.

Accordingly, the casting evaluation unit 222 can calculate the total vibration frequency N during the fishing line discharge period with the following Equation 2.

$$N = (Fs + Fe)/2 \times Tr \qquad \text{(Equation 2)}$$

The total vibration frequency N calculated using the Equation 2 above can achieve at least a certain degree of accuracy when the decreased amount of the frequency per unit time is essentially equal over the course of the fishing line discharge period, as illustrated in FIG. 3A. When surf casting, or the like, the amount of decrease in frequency per unit time tends to be essentially equal over time.

Figure 3B:
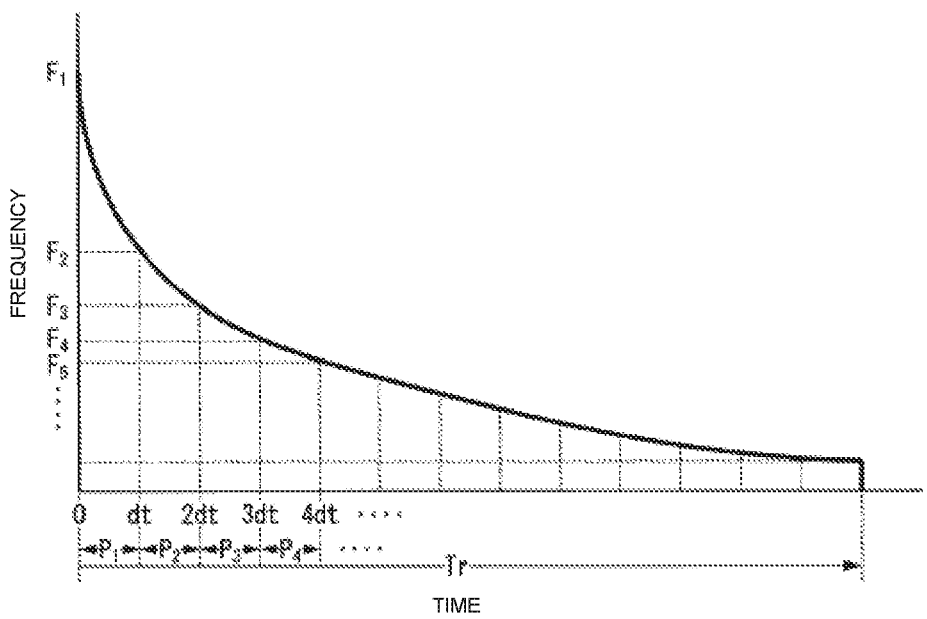

However, as illustrated in FIG. 3B, there are situations in which the frequency is greatly attenuated during the initial stage of the fishing line discharge period. This type of change in frequency can tend to occur, for example, when casting using a lure that has large air resistance as the tackle. The more pronounced the change in frequency, as shown in FIG. 3B, the greater the error in the calculated total vibration frequency N in the calculation according to Equation 2.

Therefore, the total vibration frequency N can be calculated by the following Equations 3 and 4, using Nk ($1 \leq k \leq n$) as a division vibration frequency for each division period Pk divided in accordance with the passage of a set time dt from the start of the fishing line discharge period, and $F_k$ and $F_{k+1}$ respectively as the frequencies corresponding to the start and end of the division period Pk.

$$N = N_1 + N_2 + \ldots + N_{n-1} + N_n \qquad \text{(Equation 3)}$$

$$N_k = (F_k + F_{k+1})/2 \times dt \qquad \text{(Equation 4)}$$

In this embodiment, the set time dt can be set giving consideration to making the finally calculated flight distance error fall below a required level.

Since the calculated total vibration frequency N will be more accurate for a calculation that employs Equations 3 and 4, the casting evaluation unit 222 according to the present embodiment can calculate the total vibration frequency N using Equations 3 and 4. However, for example, when it is sufficient to simply obtain the flight distance, the total vibration frequency N can be calculated using Equation 2. When Equation 2 is employed, it is possible to reduce the calculation processing load.

In addition, the casting evaluation unit 222 calculates the flight distance D (m) by Equation 5 below, using the total vibration frequency N calculated usingEquation 2, or Equations 3 and 4, and a spool diameter representative value S2.

$$D = N \times S2\pi/1000 \qquad \text{(Equation 5)}$$

The spool diameter representative value S2 used for calculating the flight distance D can be set to a different value than the spool diameter representative value S1, as follows.

The actual spool diameter decreases as the fishing line is released due to casting. For this reason, higher accuracy with regard to the spool diameter representative value S2 can be expected if a prescribed value that is smaller than the spool diameter corresponding to the standard line winding amount is applied. Therefore, the spool diameter representative value S2 can be set to an intermediate value between the standard line winding amount and a prescribed line winding amount that is less than the standard line winding amount (for example, the average value).

The spool diameter representative value S2 such as described above can also be set by the user carrying out an operation to input, for example, a numerical value provided by the manufacturer.

Alternatively, the user can carry out an operation to select the spinning reel that the user uses from among a list of spinning reel models, and the spool diameter representative value S1 corresponding to the selected spinning reel can be set.

In addition, for example, when the spinning reel 300 is a product in which the sensor unit 100 is disposed as a discrete component, the user terminal device 200 can receive and set the spool diameter representative value S2 stored in the sensor unit 100.

The casting evaluation unit 222 can output the flight distance D and the initial casting speed Vst is calculated as described above as the evaluation results.

Since the initial casting speed Vst and the flight distance D calculated as described above use representative values for the spool diameter, for example, a certain degree of error can occur with respect to the actual initial casting speed and flight distance. However, in the embodiments described herein, the errors between the initial casting speed Vst and the flight distance D calculated by the casting evaluation unit 222 as described above and the actual initial casting speed and flight distance are not a problem in practical use, i.e., not statistically significant. Specifically, regarding the flight distance, the error of the calculated flight distance D with respect to the actual flight distance of about 170 m was about several meters.

The notification unit 223 notifies the evaluation results regarding casting obtained from the casting evaluation unit 222. Specifically, the casting evaluation unit 222 causes the display unit 203 to display the calculated initial casting speed Vst and flight distance D in a prescribed manner.

For example, the configuration can be such that target values of the initial casting speed and the flight distance can be set by user operation. In addition, the notification unit 223 can display the degree of deviation between the calculated initial casting speed Vst and flight distance D from the target values in a prescribed manner, or carry out a display to present to the user a message, etc., corresponding to the degree of deviation.

The display unit 203 carries out the display in accordance with control by the control unit 202.

The operating unit 204 collectively indicates operation elements, such as buttons disposed on the user terminal device 200, operation devices disposed in the user terminal device 200, operation devices that are connected to the user terminal device 200, and the like. For example, if the display unit 203 is a touch panel, the operating unit 204 includes devices such as a touch pad that constitute the touch panel.

The storage unit 205 stores various data corresponding to the user terminal device 200. In the present embodiment, the storage unit 205 stores the set spool diameter representative values S1, S2. In addition, the storage unit 205 stores the detection signal transmitted from the sensor unit 100.

Figure 4:
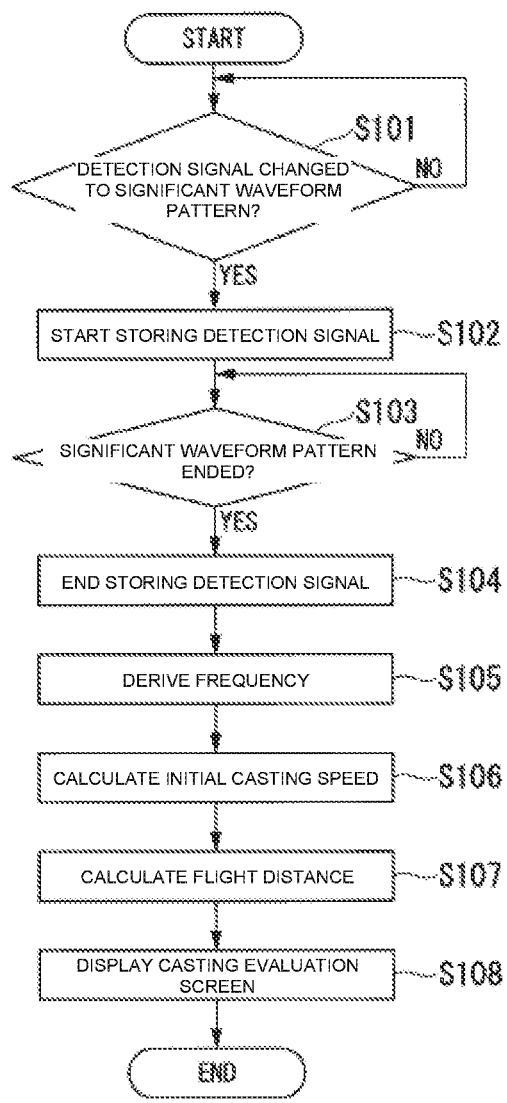
FIG. 4 is a flowchart illustrating an example of a process procedure executed by a user terminal device according to the first embodiment.

An example of a processing procedure executed by the user terminal device 200 will be described with reference to the flowchart of FIG. 4.

Step S101: For example, the detection signal of the sensor 101 is continuously transmitted from the sensor unit 100 to the user terminal device 200. In the user terminal device 200, the detection signal received by the communication unit 201 is input to the frequency derivation unit 221. The frequency derivation unit 221 monitors the input detection signal.

The detection signal input to the frequency derivation unit 221 does not display a waveform pattern that changes periodically in a state in which the fishing line is not released from the spool 301, but displays a waveform pattern that changes periodically when the fishing line is released from the spool 301 due to the execution of a cast. The waveform pattern of the detection signal that changes periodically is a significant waveform pattern that is compatible with the derivation of the frequency.

Therefore, the frequency derivation unit 221 waits for the monitored waveform pattern of the detection signal to change from an insignificant state to a significant state.

Step S102: In response to the waveform pattern of the detection signal changing to the significant state, the frequency derivation unit 221 starts to store the detection signal in the storage unit 205.

Step S103: After the processing of Step S102, the frequency derivation unit 221 waits for the significant waveform pattern of the detection signal to end. The end of the significant waveform pattern of the detection signal corresponds to a state in which the release of the fishing line from the spool 301 has stopped due to the cast tackle landing on or striking the water.

Step S104: In response to the ending of the significant waveform pattern of the detection signal, the frequency derivation unit 221 ends the storage of the detection signal started in Step S102. In this manner, the storage unit 205 stores the detection signal corresponding to the fishing line discharge period during which the fishing line is released from the spool 301 as a result of one cast.

Step S105: The frequency derivation unit 221 uses the detection signal stored in the storage unit 205 and derives the frequency in the time series of the fishing line discharge period.

Step S106: The casting evaluation unit 222 uses the frequency (Fs) corresponding to the start timing of the fishing line discharge period, from among the frequencies in the time series of the fishing line discharge period derived in Step S105, to calculate the initial casting speed by a calculation using, for example, the above-mentioned Equation 1.

Step S107: Additionally, the casting evaluation unit 222 uses the frequencies (Fs, Fe) in the time series of the fishing line discharge period derived in Step S105 to calculate the flight distance by a calculation using the above-mentioned Equations 1 and 2.

Step S108: The notification unit 223 causes the display unit 203 to display casting evaluation information that reflects the initial casting speed calculated in Step S106 and the flight distance calculated in Step S107.

Second Embodiment

Figure 5:
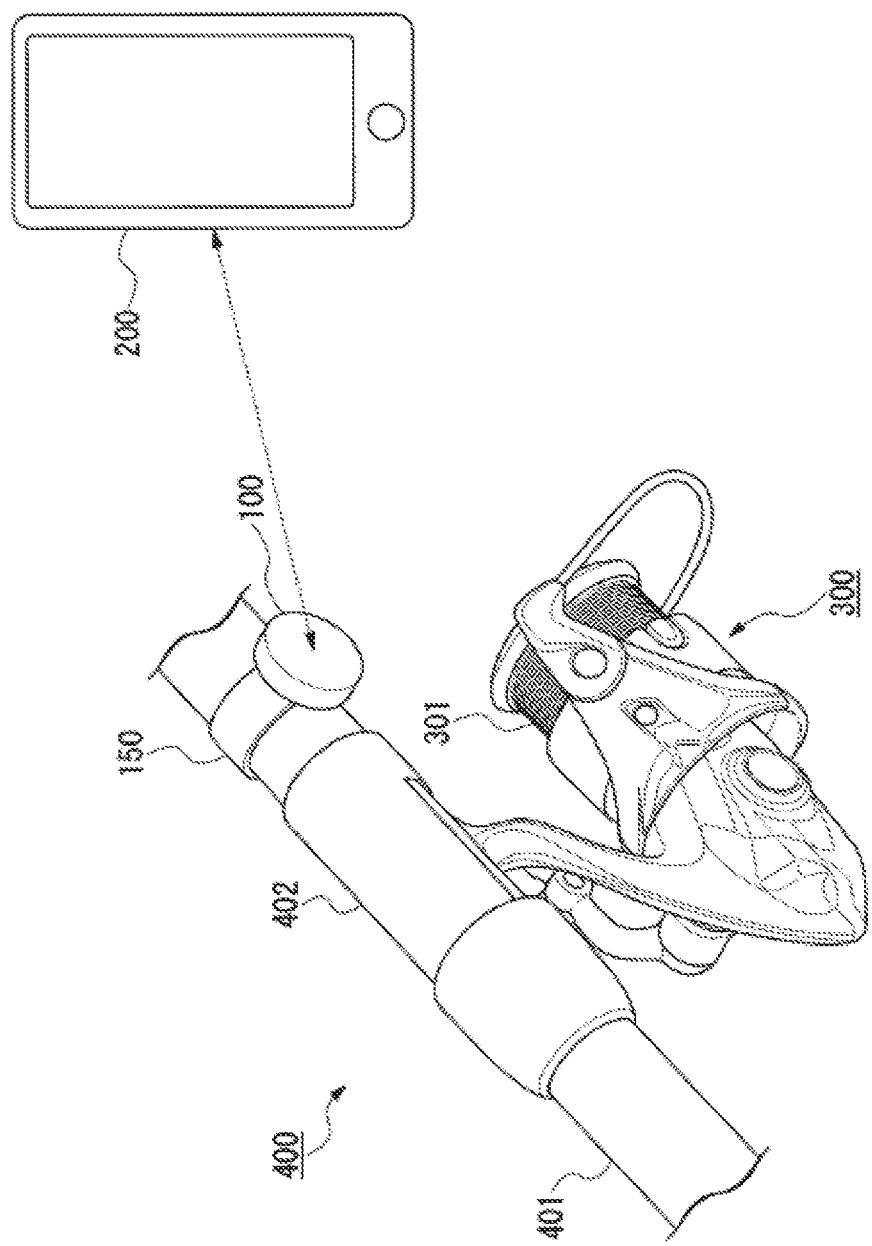
FIG. 5 is a view illustrating an example of the overall configuration of the casting evaluation system according to a second embodiment.

FIG. 5 is a view illustrating an example of the overall configuration of the casting evaluation system according to a second embodiment. In the drawing, the same parts as those of FIG. 1 have been assigned the same reference symbols and descriptions thereof have been omitted.

In the present modified example, the sensor unit 100 is provided on the fishing rod 400. An example in which the sensor unit 100 is attached to the fishing rod 400 via a fixture 150 is shown in the drawing.

The vibration that accompanies the release of the cast fishing line from the spool 301 is also transmitted to the fishing rod 400 to which the spinning reel 300 is attached. Therefore, in this modified example also, the sensor unit 100 can detect the vibration that accompanies the release of the fishing line from the spool 301.

Also, in this embodiment, the sensor unit 100 can be configured to be retrofitted to a prescribed position of the fishing rod 400, or can be pre-installed on the fishing rod 400 as a discrete component of the product of the fishing rod 400.

Additionally, the portion of the fishing rod 400 on which the sensor unit 100 is disposed is not particularly limited, including, for example, the rod butt portion.

Modified Example

Modified examples of the present embodiment will now be described.

In the description of the embodiments described above, different values for the spool diameter representative values S1, S2 were described, but the same value can be applied to the spool diameter representative values S1, S2 as long as the necessary level of accuracy in the calculation of the initial casting speed Vst and the flight distance D can be maintained. In this embodiment, since a common spool diameter representative value can be used, the process related to the calculation of the initial casting speed Vst and the flight distance D can be further simplified.

When the flight distance D is calculated, the casting evaluation unit 222 can change the spool diameter representative value S2 that is applied to Equation 3 in accordance with the progress of time of the fishing line discharge period. When the spool diameter representative value S2 is changed in this manner, the thickness of the fishing line wound around the spool 301 is set in the user terminal device 200. For example, specifications of the fishing line, such as the type (nylon, PE, etc.), class number, poundage, etc., of the fishing line can be input, and the thickness of the fishing line corresponding to the input specification can be set.

For example, the casting evaluation unit 222 divides the fishing line discharge period into sections corresponding to a certain vibrational frequency and calculates the amount of decrease in the spool diameter corresponding to each section based on the discharge length of the fishing line and the thickness of the fishing line for each section. The casting evaluation unit 222 can calculate the spool diameter representative value S2 for each section based on the calculated amount of decrease in the spool diameter.

In the embodiments described above, a casting evaluation screen that reflects both evaluation items of the initial casting speed and the flight distance is displayed, but a casting evaluation screen that reflects one evaluation item of either the initial casting speed or the flight distance can be displayed instead. In this case, the casting evaluation unit 222 need not execute the process of calculating the evaluation item that is not reflected in the casting evaluation screen.

The sensor 101 of the sensor unit 100 according to the present embodiment can detect the sound that accompanies the release of fishing line from the spool 301 due to casting. In this embodiment, the sensor unit 100 can be configured to detect sound with the sensor 101 and to transmit, for example, a signal of the detected sound (audio signal) as the detection signal from the communication unit 102. In this embodiment, the frequency derivation unit 221 of the user terminal device 200 derives the frequency of the input audio signal. Alternatively, the sensor unit 100 can be configured to detect sound with the sensor 101, convert the detected sound to vibration, and to transmit a signal indicating the converted vibration as the detection signal from the communication unit 102.

The fishing reel in the casting evaluation system according to the present embodiment is not particularly limited, as long as vibration is periodically generated due to the release of fishing line from the spool.

The above-described process as the sensor unit 100 and the user terminal device 200 can be carried out by storing a program for realizing the above-described function as the sensor unit 100 and the user terminal device 200 in a storage medium that can be read by a computer, and causing a computer system to read and execute the program that is stored in this storage medium. Here, "causing a computer system to read and execute the program that is stored in this storage medium" includes installing the program in the computer system. The "computer system" here includes the OS and hardware such as peripheral devices. In addition, "computer system" can also include a plurality of computer devices that are connected via a network, including the Internet and communication lines such as WAN, LAN, and dedicated lines. Additionally, "storage medium that can be read by a computer" refers to storage devices such as portable media such as flexible discs, magneto-optical discs, ROM, and CD-ROM, and hard disks that are incorporated in a computer system. In this manner, the storage medium that stores the program can be a non-transitory storage medium, such as a CD-ROM. In addition, the storage medium includes an internally or externally disposed storage medium that can be accessed from a distribution server in order to distribute the program. The code of the program that is stored in the storage medium of the distribution server can differ from the code of the program that is in a format that can be executed by the terminal device. That is, as long as the program can be downloaded from the distribution server and installed in a form that can be executed by the terminal device, the format in which the program is stored in the distribution server is not limited. The program can be divided into a plurality of pieces and merged on the terminal device after downloading at different timings, or the distribution server that distributes each of the divided programs can differ. Moreover, "storage medium that can be read by a computer" shall also include media that retains the program for a set period of time, such as volatile memory (RAM) inside the computer system which acts as the server or the client when the program is transmitted via the network. In addition, the above-described program can realize a portion of the functions described above. Moreover, the program can be able to realize the functions described above through combination with a program already stored in the computer system, i.e., a so-called difference file (difference program).

What is claimed is:

1. A casting evaluation device, comprising:
   a frequency derivator configured to derive a frequency of sound or vibration based on an output of a sensor that detects the vibration or the sound that accompanies the release of a fishing line from a spool of a fishing reel; and
   a casting evaluator configured to evaluate prescribed evaluation items related to casting based on the frequency derived by the frequency derivator.

2. The casting evaluation device according to claim 1, further comprising
 a notifier configured to carry out a notification regarding an evaluation result by the casting evaluator.

3. The casting evaluation device according to claim 2, wherein
 the casting evaluator is configured to
 calculate a discharge speed of the fishing line at a timing at which discharge of the fishing line is started based on a diameter of the spool and the frequency derived by the frequency derivator in accordance with the timing at which the discharge of the fishing line from the spool is started, and output a calculated discharge speed as the evaluation result.

4. The casting evaluation device according to claim 2, wherein
 the casting evaluation unit is configured to
 calculate a length of fishing line that has been released during a discharge period based on a diameter of the spool and the frequency derived by the frequency derivator during a discharge period from a time of discharge of the fishing line from the a time the spool is started until a time the discharge of the fishing line ends, and output the calculated length of the fishing line as the evaluation result.

5. A casting evaluation program for causing
 a computer serving as a casting evaluation device to function as
 a frequency derivator to derive a frequency of sound or vibration based on an output of a sensor that detects the vibration or the sound that accompanies the release of a fishing line from a spool of a fishing reel, and
 a casting evaluator to evaluate prescribed evaluation items related to casting based on the frequency derived by the frequency derivator.

\* \* \* \* \*